United States Patent [19]

Degrassi et al.

[11] Patent Number: 5,707,750
[45] Date of Patent: Jan. 13, 1998

[54] RETORTABLE, HIGH OXYGEN BARRIER POLYMERIC FILMS

[75] Inventors: Alfieri Degrassi, Pottsville; James Ivan Fryer, Schuylkill Haven; Andrew Gerard Hitzel, Pottsville; Michael Stanley Matas, St. Clair, all of Pa.

[73] Assignee: AlliedSignal Inc., Morristownship, N.J.

[21] Appl. No.: 328,300

[22] Filed: Oct. 24, 1994

[51] Int. Cl.$^6$ .............................. B32B 27/34; B32B 27/32
[52] U.S. Cl. ..................... 428/475.8; 264/176.1; 428/475.5; 428/476.1; 428/476.3; 428/476.9; 428/910
[58] Field of Search ............... 428/474.9, 475.5, 428/475.8, 476.3, 476.9, 34.7, 35.4, 36.7, 910, 474.7, 476.1; 264/176.1

[56] References Cited

U.S. PATENT DOCUMENTS

| | | | |
|---|---|---|---|
| 3,510,464 | 5/1970 | Sato et al. | 260/87.3 |
| 3,560,461 | 2/1971 | Yonera et al. | 260/87.3 |
| 3,585,177 | 6/1971 | Gardner et al. | 260/87.3 |
| 3,595,740 | 7/1971 | Gerow | 161/254 |
| 3,847,845 | 11/1974 | Tada et al. | 161/254 |
| 3,949,114 | 4/1976 | Viola et al. | 428/337 |
| 4,058,647 | 11/1977 | Inoue et al. | 428/474 |
| 4,254,169 | 3/1981 | Schroeder | 428/35 |
| 4,284,674 | 8/1981 | Sheptak | 428/69 |
| 4,284,679 | 8/1981 | Blad et al. | 428/218 |
| 4,361,628 | 11/1982 | Krueger et al. | 428/475.9 |
| 4,362,385 | 12/1982 | Lobach | 355/77 |
| 4,407,873 | 10/1983 | Christensen et al. | 428/35 |
| 4,481,238 | 11/1984 | Fagerburg et al. | 428/35 |
| 4,482,587 | 11/1984 | Fagerburg et al. | 428/35 |
| 4,501,798 | 2/1985 | Koschak et al. | 428/349 |
| 4,640,852 | 2/1987 | Ossian | 428/35 |
| 4,828,915 | 5/1989 | Schroeder et al. | 428/332 |
| 4,908,272 | 3/1990 | Harada et al. | 428/412 |
| 5,032,656 | 7/1991 | Mares et al. | 526/255 |
| 5,055,355 | 10/1991 | DeAntonis et al. | 428/476.3 |
| 5,229,180 | 7/1993 | Littmann | 428/43 |
| 5,281,360 | 1/1994 | Hong et al. | 252/188.28 |

FOREIGN PATENT DOCUMENTS

| | | |
|---|---|---|
| 0 016 617 A1 | 10/1980 | European Pat. Off. |
| 0 236 099 A3 | 9/1987 | European Pat. Off. |
| 0 247 877 | 12/1987 | European Pat. Off. |
| 0 301 878 | 2/1988 | European Pat. Off. |
| 0 274 748 | 7/1988 | European Pat. Off. |
| 0 309 095 A1 | 3/1989 | European Pat. Off. |
| 0 366 802 | 5/1990 | European Pat. Off. |
| 0 504 808 | 9/1992 | European Pat. Off. |
| 0 527 237 A1 | 2/1993 | European Pat. Off. |
| 0 530 549 A1 | 3/1993 | European Pat. Off. |
| 0 530 539 | 3/1993 | European Pat. Off. |

OTHER PUBLICATIONS

R.C. Finch, "Coextruded film and sheet", Modern Plastic Encyclopedia, vol. 56 pp. 131–132, No. 10A, Oct. (1979).
Matthew H. Naitove, Sr. Editor, "Co–extrusion", Plastics Technology, pp. 61–71, Feb. (1977).
Ency. of Polymer, Sci. & Engineering, vol. 7, pp. 116, 119 (1987).
EP 53 05 49 A1 (English Abstract 1993).
JP 4,270,655 (English Abstract 1992).
JP 3,146,343 (English Abstract 1991).
Patent Abstracts of Japan vol. 016, No. 471 (M–1318) 30 Sep. 1992 & Japan A 04 169220 (Sumitomo Bakelite Co Ltd) 17 Jun. 1992.
Database WPI, Section Ch, Week 9312 Derwent Publications Ltd. London, GB; Class A32, AN93–096662 & JP A 05 038 795 (Sumitomo Bakelite Co) 19 Feb. 1993.

*Primary Examiner*—D. S. Nakarani
*Attorney, Agent, or Firm*—Roger H. Criss

[57] ABSTRACT

A polymeric film having superior oxygen barrier properties comprising at least five layers with two exterior layers independently selected from the group consisting of an aliphatic polyamide and an aliphatic/aromatic polyamide, an interior layer of ethylene vinyl alcohol copolymer or a blend of poly(m-xylylene adipamide) and ethylene vinyl alcohol copolymer, and a modified polyolefin adhesive layer between each exterior layer and the interior layer.

23 Claims, 1 Drawing Sheet

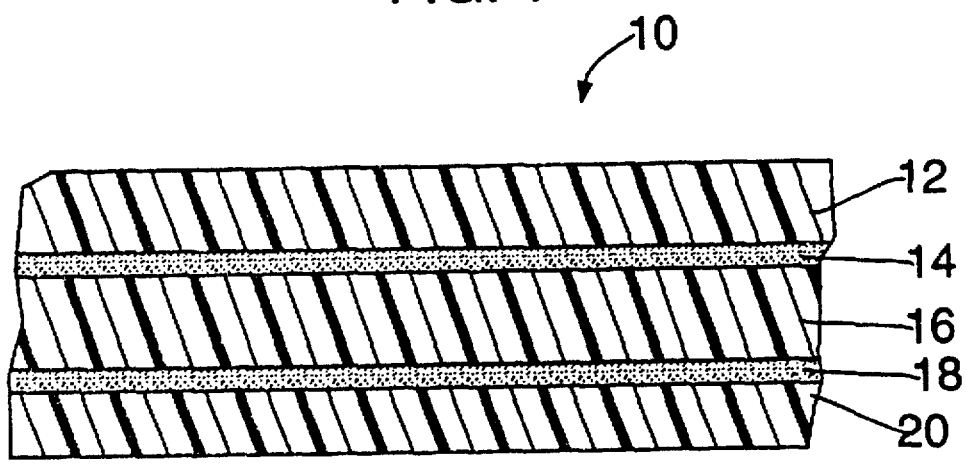

RETORTABLE, HIGH OXYGEN BARRIER POLYMERIC FILMS

BACKGROUND OF THE INVENTION

1. Field of the Invention

The present invention relates to polymeric films. More particularly, this invention relates to polymeric films having improved mechanical and gas barrier properties and capable of withstanding retorting.

2. Description of the Prior Art

It is known in the art that polyolefin films, such as polyethylene and polypropylene, are common packaging materials because of their relatively high moisture resistance. However, these polyolefins also have a fairly high permeability to gases, including oxygen, so that if used alone, they are inadequate for packaging oxygen sensitive materials, such as food.

By contrast, polymers and copolymers of vinyl alcohol, such as those of polyvinyl alcohol and ethylene vinyl alcohol, have excellent resistance to gas permeation. However, both ethylene vinyl alcohol and polyvinyl alcohol films tend to lose this desirable property in the presence of moisture. Further, if the vinyl alcohol film is either exposed to high temperatures, such as approximately 240° C. and above, or prolonged heat exposure, the film will form gels and decompose.

It is desirable to sandwich the substantially pure ethylene vinyl alcohol and polyvinyl alcohol polymers between polyolefin layers, but such polymers do not bond well to many polymer films. Furthermore, as the pure vinyl alcohol content of the interior layer is decreased by blending it with other polymers, its oxygen barrier properties likewise fall.

Also commonly used as a component in packaging films are polyamide polymers and copolymers as well as polyester polymers and copolymers. Examples of such prior art films containing polyamides are described in U.S. Pat. Nos. 4,058,647, 4,361,628, 4,254,169; 3,595,740; and 5,055,355. Examples of such prior art films containing polyesters are described in U.S. Pat. Nos. 4,999,229, 5,069,946, and 5,126,401 as well as in Japanese Patent Nos. 40-59353 A and 63-270140.

Another characteristic important to film laminates suitable for packaging materials is the ability to withstand the combination of heat and flexing to which it is often subjected during processes such as pasteurization or sterilization. However, many of the known laminates containing oxygen barrier layers are wholly unsuitable for such procedures in which they are subjected to temperatures between approximately 80° C. to approximately 130° C. As a result of their low softening points, these known barrier laminates are unable to maintain their structural integrity. Other laminates which employ aluminum foil as the barrier component tend to develop pinholes during such procedures, thereby also rendering them unsuitable for such use since such pinholes cause a serious increase in oxygen permeability. Although this tendency can be controlled by sandwiching the foil between two biaxially oriented films, such laminates are inconvenient and costly to produce, and cannot be thermoformed.

Films capable of withstanding such exposure to heat and flexing are often referred to as "retortable". Retorting, as used herein, is defined as a process used to kill bacteria in which a material is subjected to higher temperature conditions, typically between 119° C. and 123° C., than those typically employed for sterilization or pasteurization.

Retortable films comprised of two exterior layers of nylon sandwiching an EVOH layer modified with plasticizers such as nylon 6 and nylon 6/66 are disclosed in U.S. Pat. No. 4,640,852 to Ossian.

It would be desirable to provide a film which has improved mechanical and gas barrier properties and which is capable of withstanding retorting conditions (e.g., temperatures in the range of about 119° C. to 123° C.).

SUMMARY OF THE INVENTION

In accordance with this invention, there is provided a retortable film comprised of:

a) a first and second exterior layer independently comprised of a polymer selected from the group consisting of aliphatic polyamides, aliphatic/aromatic polyamides and blends thereof;

b) an interior layer selected from the group consisting of an ethylene vinyl alcohol copolymer and a blend of an aliphatic/aromatic polyamide and an ethylene vinyl alcohol copolymer; and c) an adhesive layer positioned between each exterior layer and the interior layer.

The film of this invention exhibits one or more beneficial properties. Not only do the films exhibit excellent physical and oxygen barrier properties, but they also exhibit enhanced heat resistant properties to withstand the rigors of retorting conditions. Because the films of this invention possess the combination of these properties, they are especially suited for use in goods packaging applications.

BRIEF DESCRIPTION OF THE DRAWINGS

The invention will be more fully understood and further advantages will become apparent when reference is made to the following detailed description of the invention and the accompanying drawings in which:

FIG. 1 is a cross-sectional view of a preferred structure of this invention having five co-extruded layers.

DESCRIPTION OF THE PREFERRED EMBODIMENTS

The basic form of the invention is shown by the co-extruded film of FIG. 1, which is generally designated 10. Film 10 has five layers: two exterior layers (12, 20); two adhesive layers (14, 18); and an interior layer (16). Layers 12 and 20 are formed from a polymer selected from the group consisting of aliphatic polyamides and aliphatic/aromatic polyamides. Layer 16 is formed from an ethylene vinyl alcohol copolymer or a blend of an ethylene vinyl alcohol copolymer and an aliphatic/aromatic polyamide. Layers 14 and 18 are formed from a modified polyolefin having a functional moiety selected from the group consisting of unsaturated polycarboxylic acids and acid anhydrides. Preferably, the modified polyolefin is also copolymerized with vinyl acetate.

The film of this invention is not limited to the five layers 12, 14, 16, 18 and 20, provided that layer 16 is positioned between exterior layers 12 and 20. Thus, the film of this invention may include any number of additional layers in any position as, for example, the addition of other polymeric film layers, and/or adhesive or tie layers. In the preferred embodiment of the invention, the films include only five layers 12, 14, 16, 18 and 20.

Polymers which may be employed in the exterior layers 12, 20 include aliphatic polyamides or aliphatic/aromatic polyamides. The polyamide used in layer 12 need not be the same polyamide as used in layer 20, although the same materials are preferred. As used herein, "aliphatic polyamides" are polyamides characterized by the presence of recurring carbonamide groups as an integral part of the polymer chain which are separated from one another by at least two aliphatic carbon atoms. Illustrative of these polyamides are those having recurring monomeric units represented by the general formula:

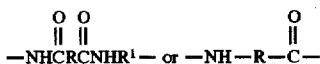

or a combination thereof in which R and $R^1$ are the same or different and are alkylene groups of at least about two carbon atoms, preferably alkylene groups having from about 2 to about 12 carbon atoms. Exemplary of such polyamides are polyamides formed by the reaction of diamines and diacids such as poly(hexamethylene adipamide) (nylon 6,6), poly (hexamethylene sebacamide) (nylon 6, 10), poly (heptamethylene pimelamide) (nylon 7,7), poly (octamethylene suberamide) (nylon 8,8), poly (hexamethylene azelamide) (nylon 6,9), poly (nonamethylene azelamide) (nylon 9,9), poly (decamethylene azelamide) (nylon 10,9), and the like. Also illustrative of useful aliphatic polyamides are those formed by polymerization of amino acids and derivatives thereof, as for example lactams. Illustrative of these useful polyamides are poly(4-aminobutyric acid) (nylon 4), poly(6-aminohexanoic acid) (nylon 6, also known as poly (caprolactam)), poly(7-aminoheptanoic acid) (nylon 7), poly (8-aminoocatanoic acid)(nylon 8), poly(9-aminononanoic acid) (nylon 9), poly(10-aminodecanoic acid) (nylon 10), poly(11-aminoundecanoic acid) (nylon 11), poly(12-aminododecanoic acid) (nylon 12) and the like. Blends of two or more aliphatic polyamides may also be employed.

Copolymers formed from recurring units of the above referenced aliphatic polyamides can be used in the fabrication of one or both exterior layers 12, 20. By way of illustration and not limitation, such aliphatic polyamide copolymers include caprolactam/hexamethylene adipamide copolymer (nylon 6/6,6), hexamethylene adipamide/ caprolactam copolymer (nylon 6,6/6), trimethylene adipamide/hexamethylene azelaiamide copolymer (nylon trimethyl 6,2/6,2), hexamethylene adipamide/ hexamethylene-azelaiamide/caprolactam copolymer (nylon 6,6/6,9/6) and the like. Preferred aliphatic polyamides for use in the practice of this invention are poly(caprolactam) and poly(hexamethylene adipamide), with poly (caprolactam) being the most preferred.

Aliphatic polyamides used in the practice of this invention may be obtained from commercial sources or prepared in accordance with known preparatory techniques. For example, polycaprolactam can be obtained from AlliedSignal Inc.

The number average molecular weight of the polyamide may widely vary. Usually, the aliphatic polyamide is of a "film-forming molecular weight", meaning a weight that is sufficiently high to form a free standing film but sufficiently low to allow melt processing of the blend into a film. Such number average molecular weights are well known to those of skill in the film forming art and are usually at least about 5,000 as determined by the formic acid viscosity method. In this method (ASTM D-789), a solution of 11 grams of aliphatic polyamide in 100 ml of 90% formic acid at 25° C. is used. In the preferred embodiments of the invention, the number average molecular weight of the aliphatic polyamide ranges between about 5,000 to about 100,000, and in the particularly preferred embodiments it ranges between about 10,000 to about 60,000. Most preferred are those in which the number average molecular weight of the aliphatic polyamide is from about 20,000 to about 40,000.

In the alternative, one or both of the exterior layers 12, 20 may be formed from an "aliphatic/aromatic polyamide". As used herein, an "aliphatic/aromatic polyamide" is characterized by the presence of recurring carbonamide groups as an integral part of the polymer chain where the carbonyl moieties are separated by aliphatic moieties having at least two carbon atoms and where the nitrogen groups are separated by aromatic moieties. Illustrative of these aliphatic/ aromatic polyamides are those having recurring units of the formula:

in which $R^2$ and $R^3$ are different and are alkylene group having at least 2 carbon atoms (preferably having from 2 to about 12 carbon atoms) or arylene (preferably substituted or unsubstituted phenylene, alkylenephenylene or dialkylenephenylene and wherein the aliphatic moieties have from 1 to about 7 carbon atoms wherein permissible substituents are alkyl, alkoxy or halo), with the proviso that when $R^2$ is arylene, $R^3$ is alkylene and when $R^2$ is alkylene, $R^3$ is arylene or dialkylene phenylene. Exemplary of such polyamides are poly(hexamethylene isophthalamide), poly (2,2, 2-trimethyl hexamethylene terephthalamide), poly(m-xylylene adipamide) (MXD6), poly(p-xylylene adipamide), poly(hexamethylene terephthalamide), poly (dodecamethylene terephthalamide), and the like.

Blends of two or more aliphatic/aromatic polyamides can also be used. Preferred aliphatic/aromatic polyamides for use in the fabrication of layer 20 are poly(hexamethylene isophthalamide), poly(2,2,2-trimethyl hexamethylene terephthalamide), poly(m-xylylene adipamide), poly(p-xylylene adipamide), poly(hexamethylene terephthalamide), and poly(dodecamethylene terephthalamide). More preferred aliphatic/aromatic polyamides are poly(2,2,2-trimethyl hexamethylene terephthalamide), poly(m-xylylene adipamide), and poly(p-xylylene adipamide), and the most preferred aliphatic/aromatic polyamide is poly(m-xylyene adipamide).

Aliphatic/aromatic polyamides can be prepared by known preparative techniques or can be obtained from commercial sources.

The number average molecular weight of the aliphatic/ aromatic polyamide may vary widely. Usually, the aliphatic/ aromatic polyamide is of a "film-forming molecular weight", again meaning a weight that is sufficiently high to form a free standing film and sufficiently low to allow melt processing of the blend into a film. Such number average molecular weights are well known to those of skill in the film forming art and are usually at least about 5,000 as determined by the formic acid viscosity method described above. In the preferred embodiments of the invention, the number average molecular weight of the aliphatic/aromatic polyamide is from about 5,000 to about 100,000, and in the particularly preferred embodiments is from about 10,000 to about 60,000. Most preferred are those in which the number average molecular weight of the aliphatic/aromatic polyamide is from about 20,000 to about 40,000.

In the more preferred embodiments of this invention, caprolactam and hexamethylene adipamide as well as copolymers and terpolymers thereof such as caprolactam/ hexamethylene adipamide copolymer (nylon 6/6,6), hexamethylene adipamide/caprolactam copolymer (nylon 6,6/6), trimethylene adipamide/hexamethylene azelaiamide copolymer (nylon trimethyl 6,2/6,2), hexamethylene adipamide/ hexamethylene-azelaiamide/caprolactam copolymer (nylon 6,6/6,9/6) are the polyamides of choice for either one or both exterior layers 12 and 20. Among these polyamides of choice, caprolactam and the copolymers and terpolymers thereof are most preferred.

Interior layer 16 may be comprised of either an ethylene-vinyl alcohol copolymer or a blend of an aliphatic/aromatic polyamide and ethylene-vinyl alcohol ("EVOH") copolymer. Preferably interior layer 16 is comprised of the EVOH copolymer alone.

The EVOH copolymer, whether used alone or in a blend in interior layer 16, preferably has an ethylene content of between about 27 mole percent to about 48 mole percent, more preferably between about 27 mole percent to about 44 mole percent, and most preferably between about 32 mole percent to about 38 mole percent. The EVOH copolymer component further preferably has a density ranging between about 1.12 g/cm$^3$ to about 1.20 g/cm$^3$, preferably about 1.19 g/cm$^3$, and a melting temperature ranging between about 142° C. to about 191° C., preferably about 183° C. EVOH copolymer can be prepared by known preparative techniques or can be obtained from commercial sources. For example, such ethylene vinyl alcohol copolymers can be obtained from Morton Inc. or Evalca, Inc.

The aliphatic/aromatic polyamides and blends thereof suitable for use in layers 12, 20 may also be used in the blend of interior layer 16.

The blend of interior layer 16 may be prepared by mechanically blending, such as in a drum tumbler, about 50% to about 95%, preferably about 65% to about 85%, of the aliphatic/aromatic polyamide with about 5% to about 50%, preferably about 15% to about 35%, of EVOH copolymer at room temperature for about 30 minutes. Most preferably, about 70% to about 80% of the aliphatic/ aromatic polyamide is mechanically blended with about 20% to about 30% of EVOH copolymer. As used herein, all percentages are by weight unless otherwise indicated. Preferably, the aliphatic/aromatic polyamide is MXD6.

Layers 14 and 18 are comprised of a modified polyolefin adhesive. The adhesive used in layer 14 need not be the same adhesive as used in layer 18. The polyolefins which may be used to form the modified reaction product suitable for the present invention include crystalline or crystallizable poly (α-olefins) and their copolymers, wherein the α-olefin monomers have between about 2 and about 6 carbon atoms. Non-limiting examples of suitable polyolefins include low, medium or high density polyethylene, linear low density polyethylene, polypropylene, polybutylene, polybutene-1, polypentene-1, poly-3-methylbutene-1, poly-4-methylpentene-1, polyhexene, and copolymers and blends thereof. Of these, preferred polyolefins are polyethylene, polypropylene, polybutylene, and copolymers and blends thereof, with polyethylene being most preferred.

The modified polyolefins suitable for use in conjunction with the present invention include copolymers and graft copolymers of a polyolefin and a constituent having a functional moiety selected from the group consisting of unsaturated polycarboxylic acids and acid anhydrides thereof. The unsaturated polycarboxylic acids and anhydrides include maleic acid, maleic anhydride, fumaric acid, crotonic acid, citraconic anhydride, itaconic anhydride and the like. Preferred of these are anhydrides, of which the most preferred is maleic anhydride.

The preferred modified polyolefin comprises between about 0 and about 15 weight percent of the functional moiety, based on the total weight of the modified polyolefin, selected from the group consisting of unsaturated polycarboxylic acids and acid anhydrides thereof. More preferably, the functional moiety comprises between about 0.1 and about 12 weight percent, most preferably between about 5 and about 10 weight percent.

The modified polyolefin of the present invention preferably further comprises between about 0 to about 1 weight percent, based on the total weight of the modified polyolefin, of vinyl acetate. More preferably, the modified polyolefin comprises between about 0 and about 0.5 weight percent of vinyl acetate; most preferably, between about 0.1 and about 0.3 weight percent.

The modified polyolefins suitable for the present invention can be obtained from commercial sources, e.g. from Du Pont under the tradename "CXA". Alternatively, such modified polyolefins may be produced in accordance with the processes known to the art, including but not limited to the processes described in U.S. Pat. Nos. 3,481,910; 3,480,580; 4,612,155 and 4,751,270. In performing the graft-polymerization of unsaturated carboxylic acid and anhydride to polyolefin, there have been utilized various methods for initiating the grafting polymerization process such as γ-ray, x-ray or high-speed cathode ray irradiation processes, and a free radical initiator process. The reaction of the polyolefin with an unsaturated polycarboxylic acid or an anhydride in the presence of a free radical (e.g. a peroxide) is the most widely used method of the grafting process. The method of using peroxide is advantageous since no special equipment or device is required for initiating the graft polymerization reaction although the method suffers from non-specificity and less than optimal grafting efficiency. Examples of the peroxides employable include benzoyl peroxide, tert-butyl peroxybenzoate, cumene hydroperoxide and azo compounds, such as azo-bis(isobutyronitrile). U.S. Pat. No. 4,612,155 discloses a grafting process employing such a radical initiator that obtains the grafting yield of 50–90 percent under favorable circumstances. U.S. Pat. No. 4,751,270 discloses more specialized radical initiators that attain up to 100 percent grafting efficiency and improve grafting specificity of the functional moiety to polyolefins.

Graft polymerization reaction is generally performed by standard graft polymerization techniques known in the art, such a heating a mixture of a polyolefin, a monomer of the functional moiety and a radical initiator, after mixing those or in mixing procedure, to a temperature at which polyolefin becomes molten, under kneading of the mixture. Alternatively, the above-stated compounds are dissolved or suspended in a appropriate solvent to perform the graft polymerization reaction.

The modified polyolefins suitable for use in the present invention may also contain at least one thermoplastic elastomer such as ethylene/propylene rubber, ethylene/1-butene rubber, butyl rubber, butadiene rubber, sytrene/butadiene rubber, ethylene/butadiene rubber, isopropene rubber, isobutylene or the like. A preferred thermoplastic elastomer is ethylene/propylene rubber. Such thermoplastic elastomers may also be modified with a constituent having a functional moiety selected from the group consisting of unsaturated polycarboxylic acids and acid anhydrides thereof, such as by the method described above in conjunction with modified poly(α-olefin).

In addition to layers 12, 14, 16, 18, and 20 for film 10, the film may include one or more optional layers, provided that layer 16 is positioned between layers 12 and 20 in film 10. Illustrative of such additional optional layers are polymeric layers formed of homopolymers and copolymers formed from α-unsaturated monomers, such as, for example, polyolefin homopolymers such as polyethylene and polypropylene, polyvinyl alcohol, ethylene/propylene copolymer, ethylene/vinyl alcohol copolymer and blends thereof. Additional layers also include other adhesive tie layers to bond various layers together. Non-limiting examples of other optional polymeric layers and adhesive or tie layers which can be used in the film laminate of the present invention are disclosed in U.S. Pat. Nos. 5,055,355; 3,510,464; 3,560,461; 3,847,845; 5,032,656; 3,585,177; 3,595,740; 4,284,674; 4,058,647; and 4,254,169.

The film of this invention can be formed by any conventional technique for forming films, including extrusion lamination and coextrusion. In the most preferred method, the film is formed by coextrusion. For example, the material of the individual layers 12, 14, 16, 18, and 20 for film 10, as well as any optional layers, are fed into infeed hoppers of the extruders of like number, each extruder handling the material for one of the layers. Preferably if more than one layer of the film is comprised of the same material, then that material is extruded into its respective layers from a single extruder. For example, if both exterior layers are comprised of the same polyamide, then the polyamide is extruded into layers 12 and 20 from a single extruder, with the extrudate being split into the respective individual layers after it passes through both the single extruder and a feedblock co-extrusion adaptor, and then emerges from the co-extrusion die. Most preferably, three extruders are used, one being for the EVOH copolymer or EVOH copolymer-MXD6 blend layer, one for the adhesive layers, and one for the polyamide layers.

The melted and plasticated streams from the individual extruders are fed into a single manifold co-extrusion die. While in the die, the layers are juxtaposed and combined, then emerge from the die as a single multiple layer film of polymeric material. After exiting the die, the film is cast onto a first controlled temperature casting roll, passes around the first roll, and thence onto a second controlled temperature roll, which is normally cooler than the first roll. The controlled temperature rolls largely control the rate of cooling of the film after it exits the die. In a preferred embodiment of this invention where layers 12 and 20 are polyamide, layers 14 and 18 are polyethylene modified with maleic anhydride and vinyl acetate, and layer 16 is EVOH copolymer, typical operating temperatures for the first and second controlled temperatures rolls are approximately 180° F. (82.5° C.) and 220° F. (428° C.), respectively.

In another method, the film forming apparatus may be one which is referred to in the art as a "blown film" apparatus and includes a multi-manifold circular die head for bubble blown film through which the plasticized film composition is forced and formed into a film "bubble". The "bubble" is ultimately collapsed and formed into a film.

Processes of coextrusion to form film and sheet laminates are generally known in the art.

The films of this invention may be of any thickness desired and include those which have thicknesses typically less than about 5 mils (127 μm). Preferably, the films have a thickness of from about 1 mil (25 μm) to about 3 mils (75 μm); more preferably the films have a thickness of from about 1 mil (25 μm) to about 1.5 mils (38 μm). While such thicknesses are preferred as providing a readily flexible film, it is to be understood that other film thicknesses may be produced to satisfy a particular need and yet fall within the scope of the present invention.

The films of this invention may optionally be stretched or oriented in any direction if so desired using methods known to those of skill in the art. In such a stretching operation, the film may be stretched in either: 1) the direction coincident with the direction of movement of the film being withdrawn from the casting roll, also referred to in the art as the "machine direction"; 2) the direction which is perpendicular to the machine direction, and referred to in the art as the "transverse direction" where the resulting film is "uniaxially" oriented; or 3) the machine direction as well as in the transverse direction, where the resulting film is "biaxially" oriented. Typically for use in the present invention, the oriented film formed from the composition of the invention are preferably produced at draw ratios of from about 3:1 to about 6:1, and preferably at a draw ratio of from about 3:1 to about 4:1. The term "draw ratio" as used herein indicates the increase of dimension in the direction of the draw. Therefore, a film having a draw ratio of 2:1 has its length doubled during the drawing process. Generally, the film is drawn by passing it over a series of preheating and heating rolls. The heated film moves through a set of nip rolls downstream at a faster rate than the film entering the nip rolls at an upstream location. The change of rate is compensated for by stretching in the film.

Typical process and range of conditions for monoaxially oriented polyamide films are disclosed, for example, in U.S. Pat. No. 4,362,385. The film laminate of the present invention can be biaxially oriented using blown tube apparatus, or a tenter frame apparatus, and can either be sequentially or simultaneously oriented biaxially. The film laminate of the present invention can also be embossed after orientation.

The films of this invention can be used for any purpose for which films can be used. One noteworthy characteristic of the films of this invention is that they exhibit excellent gas barrier properties, particularly oxygen barrier properties, at 90% relative humidity (RH). Oxygen barrier resistance may be measured using a film having a gauge of 0.60 mils and the procedure of ASTM D-3985 using an OX-Tran 1050 cell manufactured by Modem Controls Inc. operated at 23° C.

In general, using the aforesaid method, the films of this invention have an oxygen transmission rate ($O_2TR$) at 90% RH equal to or less than about 0.06 cm$^3$/100 in$^2$/24 hrs/Atm at 23° C. The superior oxygen barrier properties of the films of this invention makes them especially useful in food packaging applications.

Another noteworthy characteristic of the films of the present invention is its ability to withstand retorting. The retortable properties of the films of the present invention were tested by manufacturing an article, such as a pouch or a lid for a container, comprised of a layer of the film of the present invention sandwiched between an interior layer of polypropylene and an exterior layer of polyester. The article was sealed, then placed into an autoclave or other pressurized chamber at approximately 119° C. to about 123° C. for approximately 30 minutes. While in this chamber, the article undergoes the retorting process with the steam present therein. The films of the present invention displayed superior retortable properties, as determined by their ability to retain their original optical appearance and structural integrity.

In practical use, for example, a film with superior retortable properties is especially useful in packaging applications for food which needs to be sterilized and/or which will subsequently be heated for a "heat and serve" product. Typically, the food is placed into the pouch or container, such that the food contacts the polypropylene layer of the pouch or lid, respectfully, and the pouch or container is then sterilized. Such a sealed pouch or container often is in a form suitable for subsequent heating or cooking by the consumer.

Several examples are set forth below to illustrate the nature of the invention and the manner of carrying it out.

However, the invention should not be considered as being limited to the details thereof.

EXAMPLE I

A co-extruded film was made from two exterior layers of Nylon 6 produced by AlliedSignal Inc. sandwiching an interior layer formed of ethylene vinyl alcohol ("EVOH") copolymer obtained from Evalca, Inc. The nylon had a relative formic acid viscosity of 75. The EVOH copolymer had an ethylene content of 32 mole percent, a density of 1.19 g/cm$^3$ and a melting temperature of 183° C.

A modified polyolefin adhesive tie layer was coextruded between each exterior layer of Nylon 6 and the EVOH copolymer layer. The Nylon 6, EVOH copolymer, and the adhesive tie layers therebetween were co-extruded to form a five layer co-extruded film. The Nylon 6 was extruded through a 3½ inch (88.9 mm) diameter Davis Standard Extruder having a temperature profile of Zone 1—510° F., Zone 2—510° F., Zone 3—505° F., Zone 4—490° F, Zone 5—490° F. and adapter Zone 1—490° F., corresponding respectively to temperatures of 265°, 265°, 263°, 254°, 254°, and 254° C. The extruder operated with a screw speed of 20 rpm, a motor drive amperage of 29 amps, a barrel pressure of 950 psig (6.5 MPa), a melt temperature of the Nylon 6 at 493° F. (256° C.), and an extruder output of 150 pounds per hour (68 kg/hr).

The EVOH copolymer was extruded through a 2 inch (50.8 mm) diameter Wellex extruder. The extruder had a temperature profile which included Zone 1—350° F., Zone 2—450° F., and Zone 3—455° F. and adapter Zone 1—460° F., corresponding to temperatures of 177°, 232°, 235° and 238° C. respectively. The operating conditions of the extruder included a screw speed of 79 rpm, a motor drive amperage of 22 amps, a melt temperature of 489° F. (253.8° C.), and an extruder output of 75 pounds per hour (34 kg/hr).

The adhesive was extruded through a 1.25 inch (32 mm) diameter Wellex extruder. The extruder had a temperature profile which included Zone 1—450° F., Zone 2—475° F., and Zone 3—500° F. and adapter Zone 1—500° F., corresponding to temperatures of 232°, 246°, 260°, and 260° C., respectively. The operating conditions of the extruder included a screw speed of 81 rpm, a motor drive amperage of 6.5 amps, a melt temperature of 488° F. (253.3° C.), and an extruder out, put of 20 pounds per hour (9.0 kg/hr).

The extrudate from the three extruders was fed through a feed block coextrusion adaptor manufactured by the Johnson Plastic Corporation and operating at an adaptor temperature of Zone 1— about 490° F., and Zone 2— about 490° F. (corresponding to about 254° C.). The flat cast die temperatures were operated at about 500° F. (260° C.). The coextruded film was then cast on a roll at a temperature of about 180° F. (82° C.) and a rotation speed of 35 feet/min (10.6 m/min), followed by a cooling roll at a temperature of about 210° F. (99° C.) and a rotation speed of 36 feet/min (11 m/min). The total extrusion output was 245 pounds per hour (111 kg/hr) and the line speed was about 103 feet per minute (31.4 m/min).

The film was oriented monoaxially. The film was passed to a slow stretch roll at a temperature of about 260° F. (127° C.) and a rotation speed of about 37 feet/min (11 m/rain), and to a fast stretch roll at a temperature of about 260° F. (127° C.) and a rotation speed of 111 feet/min (33.5 m/min), and then to a heat set roll at a temperature of about 200° F. (93° C.) and a rotation speed of 110 feet/min (33.5 m/min). The line speed was 111 feet per minute (33.5 m/min) and the draw ratio was 3.0.

Four films, "Film 1" and "Film 2", "Film 3" and "Film 4", were fabricated, each employing a different adhesive. Films 1 and 2 incorporated a modified linear low density polyethylene obtained from Mitsui Petrochemicals Co. under the tradenames "Admer™ NF520A" and "Admer™ NF550A", respectively. Film 3 incorporated a modified polypropylene obtained from Mitsui Petrochemicals Co. under the tradename "Admer™ QF551A", and Film 4 incorporated a modified polyethylene obtained from Quantum Chemical, Inc. under the tradename "Plexar® PXTR008". Film 1 had an average gauge of 1.132 mils, Film 2 had an average gauge of 1.188 mils, Film 3 had an average gauge of 1.204 mils, and Film 4 had an average gauge of 1.116 mils. The films and other physical characteristics are set forth in the following Tables I and II.

TABLE I

| | FILM AND VALUE | | | |
|---|---|---|---|---|
| | FILM 1 | | FILM 2 | |
| PROPERTY | MD[1] | TD[2] | MD | TD |
| Tensile, Modulus, psi | 406800 | 308000 | 383500 | 296000 |
| (MPa) | (2786) | (2110) | (2627) | (2027) |
| Yield, psi | — | 7176 | — | 6851 |
| (MPa) | | (49) | | (47) |
| Yield Elong % | — | 10.67 | — | 10.64 |
| Strength, psi | 30160 | 12900 | 29160 | 11560 |
| (MPa) | (206) | (88) | (200) | (79) |
| Elongation % | 58.02 | 373.9 | 60.34 | 357.6 |
| Tear, Elmendorf gms/layer | 16 | 288 | 20.8 | 246.4 |
| Tear, Graves gms/mil | 473.6 | 904.0 | 399.0 | 850.2 |
| Dimensional Stability | −11.0 | −2.3 | −16.6 | −2.5 |
| 350° F. (177° C.), | −11.6 | −2.8 | −11.9 | −3.0 |
| 10 Min. | −11.4 | −2.4 | −11.6 | −2.5 |

[1]MD = machine direction
[2]TD = transverse direction

TABLE II

| | FILM AND VALUE | | | |
|---|---|---|---|---|
| | FILM 3 | | FILM 4 | |
| PROPERTY | MD[1] | TD[2] | MD | TD |
| Tensile, Modulus, psi | 364700 | 290500 | 362700 | 279100 |
| (MPa) | (2500) | (1990) | (2485) | (1912) |
| Yield, psi | — | 6376 | — | 6312 |
| (MPa) | | (44) | | (43) |
| Yield Elong % | — | 10.62 | — | 10.58 |
| Strength, psi | 27680 | 11540 | 31580 | 10080 |
| (MPa) | (190) | (79) | (216) | (69) |
| Elongation % | 60.83 | 369.5 | 66.06 | 338.7 |
| Tear, Elmendorf gms/layer | 25.6 | 440 | 27.2 | 521.6 |
| Tear, Graves gms/mil | 399.0 | 840.2 | 483.4 | 826.7 |
| Dimensional Stability | −11.9 | −2.9 | −12.8 | −3.0 |
| 350° F. (177° C.), | −12.5 | −3.0 | −13.2 | −3.4 |
| 10 Min. | −11.1 | −2.8 | −12.6 | −3.0 |

[1]MD = machine direction
[2]TD = transverse direction

EXAMPLE II

A series of experiments were carried out to test the oxygen permeability of the film laminates of this invention prepared in Example I. The films were tested for oxygen permeability using the Ox-Tran 1050 cell manufactured by Modern Controls, Inc., Elk River, Minn. and operated at 23° C. The procedure used was that disclosed in ASTM D-3985. The oxygen permeability was measured in cubic centimeters per 100 inch square per 24 hours per Atm at 23° C. and 90% relative humidity.

The results are set forth in the following Table III.

TABLE III

| FILM | $O_2$TR (90% RH) |
|---|---|
| Film 1 | 0.0771 |
| Film 2 | 0.0646 |
| Film 3 | 0.0806 |
| Film 4 | 0.0913 |

It can be said that Films 1 to 4 have excellent oxygen barrier properties.

The films produced in Example I were subjected to a standard retorting process at temperatures of about 250° F. (121° C.) for approximately 30 minutes. Both films retained their original optical appearance and structural integrity.

Thus, it can be seen that the addition of EVOH copolymer sandwiched by adhesive tie layers to a polyamide-layered composition produces a film having improved gas impermeability characteristics in comparison to those of polyester alone, which is well-known in the art to range between about 0.06 to about 0.09 cm³/100 in².

Moreover, due to EVOH copolymer's inability to withstand moisture and thus its "non-retortable" characteristics, it would be expected that if a greater than nominal amount of EVOH copolymer were added to the polyamide composition, the composition would degrade during the retortability tests. However, as demonstrated by the Example II, the addition of a significant amount of EVOH copolymer to the interior layer of a polyester-layered composition further improved the composition's overall oxygen impermeability characteristics without reducing its retortability characteristics or physical properties. Thus, the EVOH copolymer becomes retortable, while the gas impermeability characteristics of the overall composition is enhanced.

It can be seen that the present invention provides films with excellent physical and oxygen barrier properties, as well as exhibits enhanced heat resistant properties to withstand the rigors of retorting conditions.

What is claimed is:

1. A film having at least five layers comprised of:

a) a first and second exterior layer independently comprised of a polymer selected from the group consisting of polyamides, aliphatic/aromatic polyamides having the formula

and blends thereof, b) an interior layer which comprises a blend of an aliphatic/aromatic polyamide having the formula

and an ethylene vinyl alcohol copolymer; and c) a modified polyolefin adhesive layer positioned between each exterior layer and the interior layer, wherein said film is retortable, and wherein $R^2$ and $R^3$ are different and are an alkylene group having at least 2 carbon atoms or an arylene group, with the proviso that when $R^2$ is alkylene, $R^3$ is arylene and when $R^2$ is arylene, $R^3$ is alkylene.

2. A film according to claim 1 wherein said aliphatic polyamide is selected from the group consisting of polyamides having recurring monomeric units of the formula

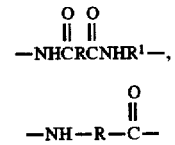

and a combination thereof wherein:
   R and $R^1$ are the same or different and are alkylene having from about 2 to about 12 carbon atoms.

3. A film according to claim 2 wherein said aliphatic polyamide is selected from the group consisting of poly(hexamethylene adipamide), poly(4-aminobutyric acid), poly(caprolactam), poly(7-aminoheptanoic acid) and copolymers of caprolactam and hexamethylene adipamide.

4. A film according to claim 2 wherein said aliphatic polyamide is poly(caprolactam), poly(hexamethylene adipamide) or a combination thereof.

5. A film according to claim 2 wherein said aliphatic polyamide is poly(caprolactam).

6. A film according to claim 1 wherein each of said adhesive layers independently comprises a modified poly($C_2$ to $C_6$ α-olefin), and about 0.1 to about 15 weight percent, based on the total weight of said modified poly($C_2$ to $C_6$ α-olefin), of a functional moiety selected from the group consisting of unsaturated polycarboxylic acids and acid anhydrides.

7. A film according to claim 6 wherein said functional moiety is selected from the group consisting of maleic acid, maleic anhydride, fumaric acid, crotonoic acid, citraconic anhydride, and itaconic anhydride.

8. A film according to claim 7 wherein said functional moiety is maleic anhydride.

9. A film according to claim 6 wherein said modified poly(α-olefin) is selected from the group consisting of low, medium or high density polyethylene, linear low density polyethylene, polypropylene, polybutylene, polybutene-1, polypentene-1, poly-3-methylbutene-1, poly-4-methylpentene-1, polyhexene, and copolymers and blends thereof.

10. A film according to claim 9 wherein said modified poly($C_2$ to $C_6$ α-olefin) further comprises from about 0.01 to about 1 weight percent, based on the total weight of said modified poly($C_2$ to $C_6$ α-olefin), of vinyl acetate moiety.

11. A film according to claim 10 wherein said modified poly($C_2$ to $C_6$ α-olefin) further comprises a thermoplastic elastomer selected from the group consisting of ethylene/propylene rubber, ethylene/1-butene rubber, butyl rubber, butadiene rubber, sytrene/butadiene rubber, ethylene/butadiene rubber, isopropene rubber, and isobutylene.

12. A film according to claim 10 wherein said modified poly($C_2$ to $C_6$ α-olefin) comprises α-olefin, about 0.01 to about 0.5 weight percent of vinyl acetate and about 0.1 to about 12 weight percent, based on the total weight of the modified poly($C_2$ to $C_6$α-olefin), of maleic anhydride.

13. A film according to claim 1 having an oxygen permeability at 90% relative humidity equal to or less than about 0.06 cm³/100 in ²/24 hrs./Atm. when measured according to ASTM D 3985.

14. A film according to claim 1 wherein each said aliphatic/aromatic polyamide is selected from the group consisting of poly(hexamethylene isophthalamide), poly(2,2-trimethyl hexamethylene terephthalamide), poly(m-xylylene adipamide), poly(p-xylylene adipamide), poly(hexamethylene terephthalamide), and poly(dodecamethylene terephthalamide).

15. A film according to claim 1 wherein said interior layer is a blend of EVOH copolymer and poly(m-xylylene adipamide).

16. A film according to claim 15 wherein said interior layer contains, based upon the total weight of the interior layer, between about 65 wt % to about 85 wt % of said poly(m-xylylene adipamide) blended with about 15 wt % to about 35 wt % of said EVOH copolymer.

17. A film according to claim 1 wherein:
said exterior layers are comprised of poly(caprolactam); and
said adhesive layer is comprised of modified poly(α-olefin) comprising α-olefin, about 0.01 to about 0.3 weight percent of vinyl acetate and about 5 to about 10 weight percent, based on the total weight of the modified poly(α-olefin), of maleic anhydride, wherein said film having an oxygen permeability at 90% relative humidity equal to or less than about 0.06 cm³/100 in²/24 hrs./Atm. when measured according to ASTM D 3985.

18. A film according to claim 1 wherein:
said exterior layers are independently comprised of a polymer selected from the group consisting of poly(caprolactam), poly(hexamethylene adipamide) and caprolactam/hexamethylene adipamide copolymer; and
said adhesive layer is comprised of modified poly(α-olefin) comprising ethylene about 0.01 to about 0.3 weight percent of vinyl acetate and about 0.1 to about 12 weight percent, based on the total weight of the modified poly(α-olefin), of maleic anhydride, said film having an oxygen permeability at 90% relative humidity equal to or less than about 0.06 cm³/100 in²/24 hrs./Atm. when measured according to ASTM D 3985.

19. A film according to claim 18 wherein said aliphatic polyamide is poly(caprolactam).

20. A film according to claim 1 wherein said film is oriented.

21. A film according to claim 1 wherein said film is oriented uniaxially.

22. A film according to claim 21 wherein said film is oriented at a draw ratio from about 3:1 to about 6:1.

23. A process for producing a retortable film comprising:
a) juxtaposing a modified polyolefin adhesive layer onto both sides of an interior layer comprised of a blend of an aliphatic/aromatic polyamide having the formula

and an ethylene vinyl alcohol copolymer, to form a three-layered combination;

b) juxtaposing a first and second exterior layer independently comprised of a polymer selected from the group consisting of aliphatic polyamides, aliphatic/aromatic polyamides having the formula

and blends thereof, onto both sides of said three-layered combination, whereby said interior and exterior layers are bonded together through said adhesive layers, wherein $R^2$ and $R^3$ are different and are an alkylene group having at least 2 carbon atoms or an arylene group, with the proviso that when $R^2$ is alkylene, $R^3$ is arylene and when $R^2$ is arylene, $R^3$ is alkylene.

* * * * *